Figure 1:
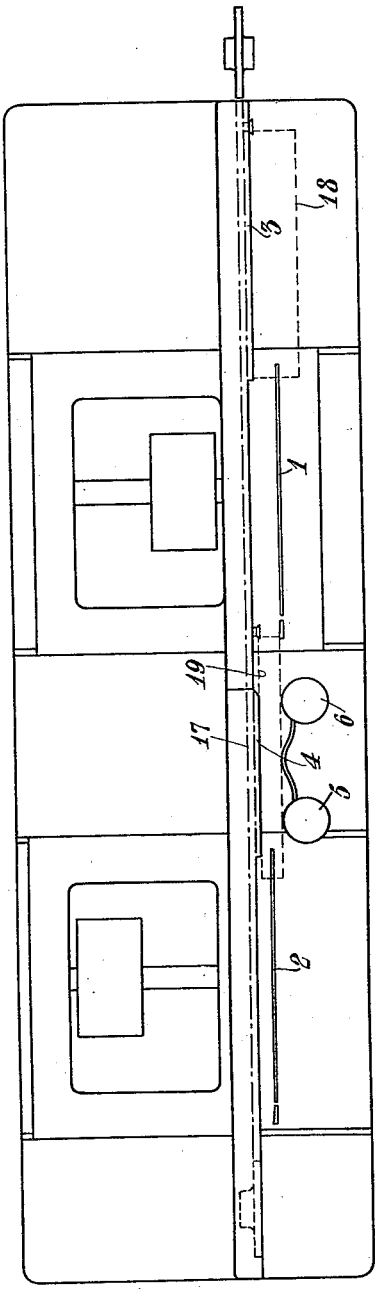

J. A. LARSSON & K. E. R. ÖSTERBERG.
RESAWING MACHINE AND THE LIKE.
APPLICATION FILED JUNE 22, 1914.

1,142,972.

Patented June 15, 1915.

UNITED STATES PATENT OFFICE.

JOHAN AUGUST LARSSON AND KARL ERIK RUDOLF ÖSTERBERG, OF STOCKHOLM, SWEDEN, ASSIGNORS TO J. & C. G. BOLINDERS MEKANISKA VERKSTADS AKTIEBOLAG, OF STOCKHOLM, SWEDEN, A CORPORATION OF SWEDEN.

RESAWING-MACHINE AND THE LIKE.

1,142,972.

Specification of Letters Patent.   Patented June 15, 1915.

Application filed June 22, 1914.   Serial No. 846,414.

*To all whom it may concern:*

Be it known that we, JOHAN AUGUST LARSSON and KARL ERIK RUDOLF ÖSTERBERG, subjects of the King of Sweden, and residents of Stockholm, in the Kingdom of Sweden, have invented new and useful Improvements in Resawing-Machines and the like, of which the following is a specification, reference being had to the drawing accompanying and forming a part hereof.

This invention relates to an improvement in re-sawing machines and the like of the kind which are provided with two or more saws located at decreasing distances from a guide or guides which support the material during the sawing. In machines of this kind it often happens that the piece cut off by the saw will be wedged or cramped between one saw and the guide, which produces an undue stress on the saw blades.

The object of this invention is to avoid the said disadvantage.

The invention is broadly characterized by this that all of the guides or parts of the guide coöperating with the saws during the sawing operation lie in the same plane, while between each of the guides, or parts of the guide is a free space, or a recessed portion of the guide extending away from the adjacent saw, so that the part of the material cut off by the saw may pass without becoming wedged or cramped between the saw and the guide.

The accompanying drawing illustrates a form of construction of the invention.

Figure 2:
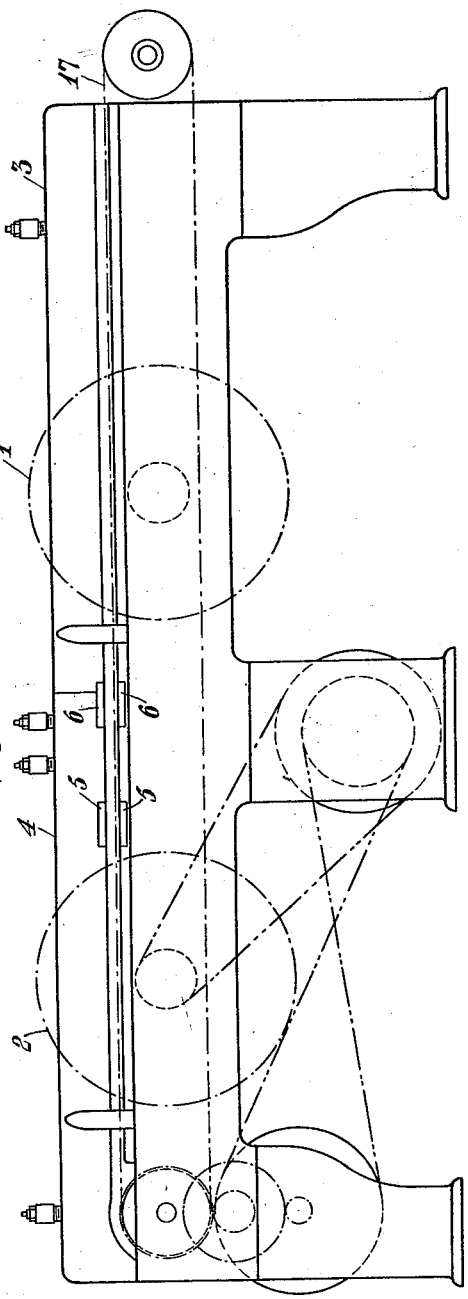

Figure 1 is a plan view of a sawing machine according to the invention, and Fig. 2 shows the machine viewed from the side.

According to Figs. 1 and 2, there are located two saws 1 and 2 in such manner relatively to the guide 3, 4 that the first saw is farther away from the guide than the next saw 2, by means of which there is cut from the material 18 fed by the feeding-chain 17 running in a recess in the guide, a part 19 which is pushed farther forward by the chain 17 to be recut by the saw 2, and by the following saws if more than two saws are used.

In order to provide a clearance for the part cut away, so that it shall not become wedged between the saw 1 and its guide 3, this latter is recessed in the direction from the saw, at a portion opposite or nearly opposite the same. Consequently, the material does not rest during the sawing operation against the portion of the guide opposite the saw, but only against the part of the guide which is located in front of the saw and indicated in the drawing by the reference character 3. Back of the saw 1 and in front of the saw 2 the guide protrudes to the same plane as in front of the saw 1. On the other side of this protruding part 4 and opposite the saw 2 the guide is again recessed in the direction from the saw. In order to hold the material against the guide 4, while the cutting is performed by the saw 2, there are provided opposite the guide 4 rollers 5 and 6, which are mounted on resilient bearings independent of each other and adjustable in suitable manner.

We claim:

1. In a re-sawing machine of the character described, the combination of a number of saws and a guide adjacent to said saws, the front face of the guide opposite each saw being recessed to provide a clearance for the material cut by the saw, substantially as described.

2. In a re-sawing machine, the combination of a guide provided in its front face with a number of clearance recesses, and saws opposite said recesses at decreasing distances from the guide, substantially as and for the purpose set forth.

3. In a re-sawing machine, the combination of a guide provided in its front face with a number of clearance recesses, saws opposite said recesses at decreasing distances from the guide, and means for effecting a resilient pressure on the material fed into the machine opposite the parts of the guide between the recesses, substantially as and for the purpose set forth.

JOHAN AUGUST LARSSON.
KARL ERIK RUDOLF ÖSTERBERG.

Witnesses:
FREDICH SCHMITSILÖW,
KOUR. DAHLGRIST.

Copies of this patent may be obtained for five cents each, by addressing the "Commissioner of Patents, Washington, D. C."